United States Patent
Graf (10) Patent No.: US 9,350,144 B2
(45) Date of Patent: May 24, 2016

(54) REMOVABLE CONTACTOR DRAWER

(71) Applicant: American Mine Research, Inc., Rocky Gap, VA (US)

(72) Inventor: Robert Graf, Rocky Gap, VA (US)

(73) Assignee: AMERICAN MINE RESEARCH, INC., Rocky Gap, VA (US)

( * ) Notice: Subject to any disclaimer, the term of this patent is extended or adjusted under 35 U.S.C. 154(b) by 222 days.

(21) Appl. No.: 14/167,367

(22) Filed: Jan. 29, 2014

(65) Prior Publication Data

US 2014/0211377 A1    Jul. 31, 2014

Related U.S. Application Data

(60) Provisional application No. 61/758,932, filed on Jan. 31, 2013.

(51) Int. Cl.
   *H02B 11/133*    (2006.01)
   *H02B 11/12*    (2006.01)

(52) U.S. Cl.
   CPC .............. *H02B 11/133* (2013.01); *H02B 11/12* (2013.01)

(58) Field of Classification Search
   CPC ...... H01H 9/342; H02B 11/12; H02B 11/127; H02B 11/167; H02B 11/173; H02B 13/025
   See application file for complete search history.

(56) References Cited

U.S. PATENT DOCUMENTS

| | | | | |
|---|---|---|---|---|
| 2,237,367 A * | 4/1941 | Scott, Jr. | ............. | H02B 11/133 200/50.23 |
| 2,258,150 A * | 10/1941 | Scott, Jr. | ............. | H02B 11/133 200/293 |
| 3,309,473 A * | 3/1967 | Wilson | ................. | H02B 11/133 200/50.24 |
| 4,101,744 A | 7/1978 | Wilson | | |
| 4,743,715 A | 5/1988 | Gerbert-Gaillard et al. | | |
| 5,343,355 A | 8/1994 | Ishikawa | | |
| 5,453,587 A * | 9/1995 | Hurley | ...................... | H02B 3/00 200/50.24 |
| 5,477,017 A * | 12/1995 | Swindler | ............... | H02B 11/127 200/50.24 |
| 5,574,624 A * | 11/1996 | Rennie | ................. | H02B 13/025 200/289 |
| 5,689,097 A * | 11/1997 | Aufermann | .......... | H02B 13/025 218/157 |
| 5,837,949 A | 11/1998 | Green et al. | | |
| 6,777,627 B1 * | 8/2004 | Stevenson | ................ | H02B 3/00 200/50.21 |
| 6,897,388 B2 * | 5/2005 | Greer | ....................... | H02B 3/00 200/200 |
| 6,937,461 B1 * | 8/2005 | Donahue, IV | ........ | H01R 13/514 174/50 |
| 6,951,990 B1 * | 10/2005 | Miller | ................... | H02B 11/127 200/50.21 |
| 7,019,230 B1 * | 3/2006 | Vaill | ..................... | H02B 11/127 200/50.21 |
| 7,277,294 B2 | 10/2007 | Carlson | | |
| 7,365,964 B2 * | 4/2008 | Donahue, IV | ........ | H01R 13/514 174/50 |
| 7,825,344 B2 * | 11/2010 | Stevenson | ............ | H02B 11/127 200/50.21 |
| 8,063,323 B1 * | 11/2011 | Ledbetter | ................ | H02B 3/00 200/50.21 |

(Continued)

*Primary Examiner* — Robert J Hoffberg
(74) *Attorney, Agent, or Firm* — Harness, Dickey & Pierce, P.L.C.

(57) ABSTRACT

A removable contactor drawer including a transitional chamber receivable in a fixed casing. The transitional chamber including electrical components for an electrical feeder circuit. The fixed casing being designed to be mounted and used within a power distribution center and has input connectors for the incoming electrical power. Source power may be channeled through the electrical components via the fixed casing and delivered to a power outlet on a front face of the transitional chamber. The transitional chamber may optionally contain equipment to monitor and report operational faults within the contactor drawer. A front-mounted motor drive allows a remotely located operator to perform removal of the transitional chamber while under power, thus providing protection against the danger of arc flash.

10 Claims, 6 Drawing Sheets

(56) References Cited

U.S. PATENT DOCUMENTS

| | | | | |
|---|---|---|---|---|
| 8,151,452 | B2* | 4/2012 | Ledbetter | H02B 3/00 200/50.21 |
| 8,156,639 | B1* | 4/2012 | Ledbetter | H02B 3/00 200/50.21 |
| 8,161,631 | B1* | 4/2012 | Ledbetter | H02B 3/00 200/50.21 |
| 8,183,480 | B2* | 5/2012 | Kim | H02B 11/127 200/50.21 |
| 8,198,557 | B2* | 6/2012 | Lee | H02B 11/133 200/50.21 |
| 8,228,225 | B1* | 7/2012 | Ledbetter | H02B 3/00 200/50.24 |
| 8,261,433 | B1* | 9/2012 | Ledbetter | H02B 3/00 200/50.21 |
| 8,294,051 | B2* | 10/2012 | Park | H02B 11/133 200/50.21 |
| 8,307,545 | B1* | 11/2012 | Ledbetter | H02B 3/00 200/50.21 |
| 8,325,078 | B1* | 12/2012 | Ledbetter | H02B 3/00 200/50.24 |
| 8,395,065 | B2* | 3/2013 | Zylstra | H02B 11/127 200/50.24 |
| 8,446,709 | B2* | 5/2013 | Beaver | H02B 11/02 200/50.21 |
| 8,553,394 | B2* | 10/2013 | Hawkins | H02B 11/127 200/50.24 |
| 8,604,369 | B2* | 12/2013 | Greer | H02B 3/00 200/50.24 |
| 8,654,513 | B2* | 2/2014 | Bower | H02B 11/127 200/50.24 |
| 2009/0015990 | A1 | 1/2009 | Kim et al. | |
| 2009/0255789 | A1 | 10/2009 | Narayanan et al. | |

* cited by examiner

REMOVABLE CONTACTOR DRAWER

FIELD

The subject matter of the present specification relates to a removable contactor drawer such as an electrical vacuum contactor removable drawer used in electrical supply systems, and especially to the realm of electrical feeder circuits. More specifically, the removable contactor drawer relates to a modularized feeder circuit control panel for a power distribution system such as power distribution systems used in mines.

BACKGROUND

In electrical supply and power distribution centers, and especially in power distribution centers used in mining operations, the repair of power distribution centers while energized is usually a challenging endeavor. The power centers are often located underground and are frequently situated far from modern conveniences. The environment in which power distribution centers and driven equipment are normally located is dark, dirty, dusty, rugged, damp, and fraught with safety hazards. In the event of an electrical or mechanical failure of such equipment, it is usually quite difficult to evacuate defective equipment outside the mine to a clean environment for a technician to accomplish any necessary repairs. Due to the extensive size of such equipment and due to production demands and requirements, the technician must often accomplish any necessary repairs in the mining environment. Similarly, because the equipment remains in an inoperable condition for an extended period of time, there is a corresponding loss in productivity as the equipment reliant on the electrical power is idled.

SUMMARY

In at least one exemplary embodiment of the subject matter of the present specification, a removable contactor drawer may include a vacuum contactor removable drawer applicable for use in electrical power supply and distribution systems. The removable drawer is particularly suited for mining operations. The removable drawer includes a fixed casing with mounted main bus supply connectors and provides for power output to a vacuum contactor or other switching and/or control instruments. A removable transitional chamber is mountable to the fixed casing and may support the vacuum contactor or other switching and/or control instruments, as well as receiving power connectors. The main bus supply connectors and the receiving power connectors are positioned for mating engagement upon selective movement of the transitional chamber relative to the fixed casing. An observation window in the face of the front panel may be included to provide visual confirmation of the functional status of fuses within the transitional chamber from outside the removable drawer.

In an exemplary embodiment, the transitional chamber is configured in a tray-like manner to carry the electrical conducting and controlling components of the removable drawer such that repairs may be easily made when all components are de-energized. An example of a typical repair is the removal and replacement of a defective fuse. When such a repair is made, the same transitional chamber may be immediately returned to service by being reinserted into the fixed casing. Alternatively, a new or different transitional chamber that is operable may be substituted for a defective transitional chamber and the defective transitional chamber may then be evacuated to a suitable repair site.

In an exemplary embodiment, the removable contactor drawer features output power distributed through the front of the drawer, preferably through an outlet which in turn feeds power into a plug and to a trailing cable.

BRIEF DESCRIPTION OF THE DRAWINGS

The subject matter of the present specification will now be explained in more detail using exemplary embodiments, which are not exclusive, and with reference to the attached drawings, in which.

DETAILED DESCRIPTION OF EXEMPLARY EMBODIMENTS

In mining applications in particular, the environmental and operational constraints render repair of the electrical components of the equipment used in the electrical supply and power distribution systems within the confines of the mine a difficult mission. To overcome the difficulties encountered during such repairs, the removable contactor drawer provides for the rapid repair or replacement of defective equipment such as a blown fuse 22 thereby effectuating minimal interruption of operating equipment 93 for which the electrical power is provided. Because the operative electrical components of mining power distribution centers are carried primarily by the transitional chamber 20 in a modular package, a defective assembly and/or item may be quickly replaced by completely removing the defective transitional chamber 20, and replacing the chamber with an operational chamber, thereby permitting rapid resumption of the mining processes. The defective components may then be repaired by evacuating transitional chamber 20 to a repair site or facility designed for maintenance. In addition, replacement of one or more fuses 22, for example, attached to a vacuum contactor 30 or other switching and/or control instruments is a simple process, requiring merely for the drawer to be disengaged for a brief time while replacement of any such defective or blown fuses 22 is accomplished.

Figure 1:
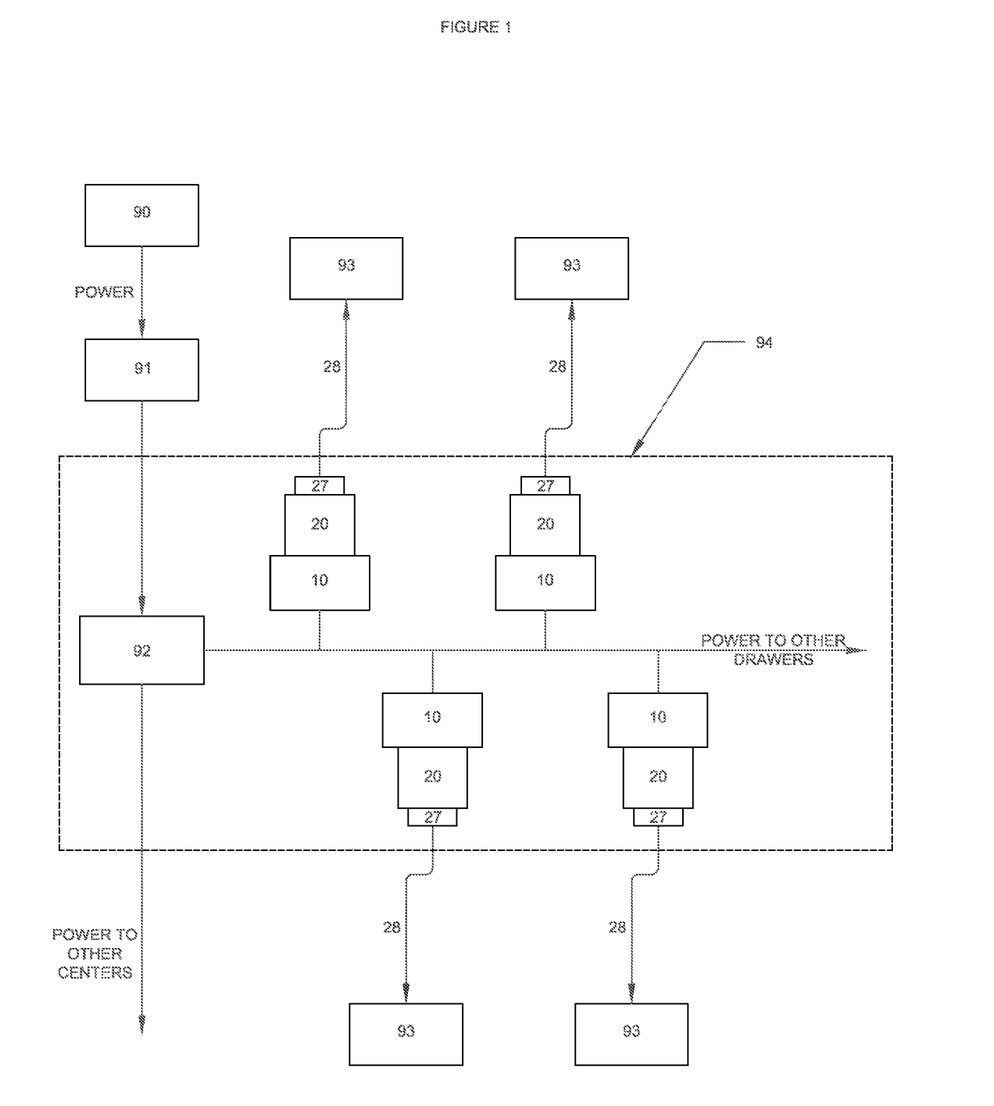
FIG. 1 is a schematic drawing of an exemplary electrical system and power center supporting the removable contactor drawer.

FIG. 1 depicts a typical schematic of a basic power center 94 used, for example, in a mine. As shown in FIG. 1, power from a utility company 90 is supplied through a substation 91, where the voltage is stepped down prior to entering the power center 94. The voltage may then be stepped down again at a mine transformer 92. The stepped down power is then distributed to one or more fixed casings 10 in the power center 94. In an exemplary embodiment, the power center 94 may include a housing and/or frame (not shown) to which the fixed casing(s) 10 may be attached. Power is delivered through the fixed casing(s) 10 to a transitional chamber 20 in the fixed casing 10 to a plug 27 and trailing cable 28 and then to the driven operating equipment 93 (such as mining equipment, ventilation equipment, etc.). The power center 94 may include many removable contactor drawers 10, 20 (stacked vertically and/or horizontally) therein.

Figure 2:
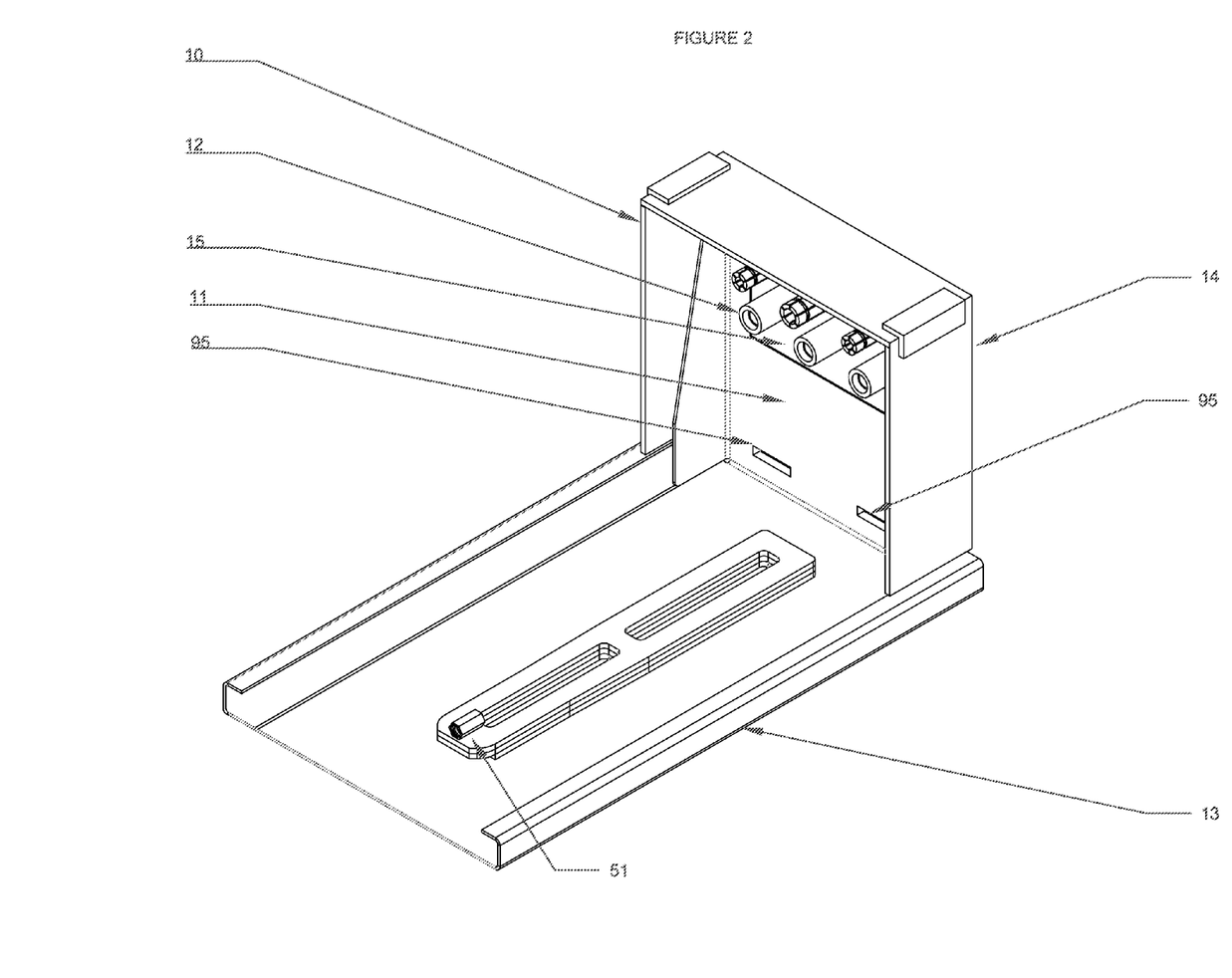
FIG. 2 is a perspective view of an exemplary embodiment of a fixed casing of the removable contactor drawer.

FIG. 2 depicts an exemplary embodiment of a fixed casing 10 of the removable contactor drawer. The fixed casing 10 is mounted to the power center 94 to provide an interface between input power and the operating equipment 93. As shown in FIG. 2, the fixed casing 10 provides support for one or more main bus input connectors 12, which receive electrical power input to the drawer from the mine transformer 92. The main bus input connectors 12 are mounted to a nonconductive mounting board 15, which in turn is mounted to a rear panel 11 of the fixed casing 10. Support members 13 may be provided on the fixed casing 10 to receive and operatively guide a transitional chamber 20 into fitting contact with the main bus input contactors 12. In an exemplary embodiment, the support members 13 may be guide rails that receive a corresponding element on the transitional chamber 20 thereby providing linkage with the transitional chamber 20. The fixed casing 10 may also include an actuator catch 51 described in more detail below.

Figure 3:
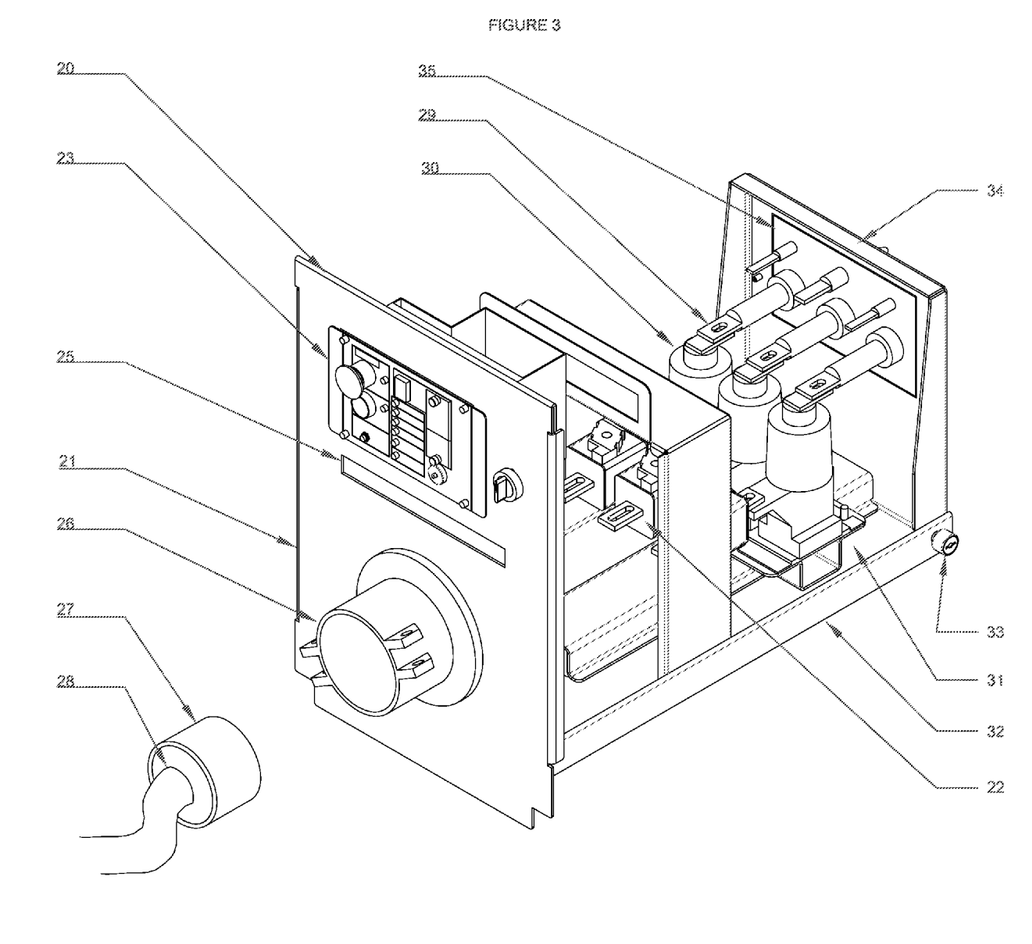
FIG. 3 is a perspective view of an exemplary transitional chamber of the removable contactor drawer.

FIG. 3 depicts an exemplary embodiment of a transitional chamber 20 of the removable contactor drawer. As shown in FIG. 3, the transitional chamber 20 may include a support tray 31 and a front panel 21 at a first end of the tray 31. The transitional chamber 20 may also include a pair of longitudinal support members 32 extending from the front panel 21 to connector bracket 34 located at an opposite end of the support tray 31. Receiving connectors 29 are secured to a nonconductive mounting board 35 located in the connector bracket 34.

The receiving connectors 29 are positioned for mating engagement with the main bus input connectors 12 of the fixed casing 10 when the transitional chamber 20 is inserted into the fixed casing 10. In an exemplary embodiment, electrical power from the main bus input connectors 12 of the fixed casing 10 is fed through the receiving connectors 29 of the transitional chamber 20 to one or more vacuum contactors 30 or other switching and/or control instruments in the transitional chamber 20 through fuses 22 and ultimately to a power outlet 26 located on the front panel 21 of the drawer. Power may then be fed from the power outlet 26 into a plug 27 and to a trailing cable 28, and eventually to driven operating equipment 93.

In an exemplary embodiment, the transitional chamber 20 may further include controls 23 mounted on the front panel 21 for operating the removable drawer, such that the components within the transitional chamber 20 may be readily monitored and controlled when the drawer 10, 20 is installed into the power center (e.g., a power distribution panel). During operation of the removable contactor drawer, it is desirable to monitor conditions of the components and their respective parameters for the electricity carried therein for changes such as short circuits, overloads, ground faults, overvoltages, undervoltages, overcurrents, phase imbalances, and the like. In an exemplary embodiment, visual surveillance of the components, such as the fuses 22, can be performed through an observation window 25.

In use, the transitional chamber 20 of the drawer is inserted into, or otherwise operatively engaged with, the fixed casing 10. In an exemplary embodiment, the support members 13 of the fixed casing 10 cooperatively engage the longitudinal support members 32 of the transitional chamber 20 such that transitional chamber 20 slides into fixed casing 10. In an exemplary embodiment, engagement between the transitional chamber 20 and the fixed casing 10 may be enhanced with the use of rollers 33, which may be attached to either the transitional chamber 20 or the fixed casing 10. In an exemplary embodiment, the rollers 33 may be affixed to the longitudinal support members 32 of the transitional chamber 20 and be received in rolling contact with the support members 13 of the fixed casing 10.

In an exemplary embodiment, the removable contactor drawer 10, 20 may further include features for mitigation of the danger of arc flash that may occur when the transitional chamber 20 and the fixed casing 10 are being engaged and/or disengaged from one another. As discussed above, the main bus input connectors 12 are mounted to the nonconductive mounting board 15, and the receiving connectors 29 are mounted to the nonconductive mounting board 35. In addition, the removable contactor drawer 10, 20 may include an arc flash shield 14 mounted to the fixed casing 10 (FIG. 2). The arc flash shield 14 is configured to suppress an electrical arc or spark that could injure an operator during engagement and/or disengagement of the transitional chamber 20 and the fixed casing 10. Moreover, arc flash in a mining environment could cause catastrophic injury and damage.

Figure 4:
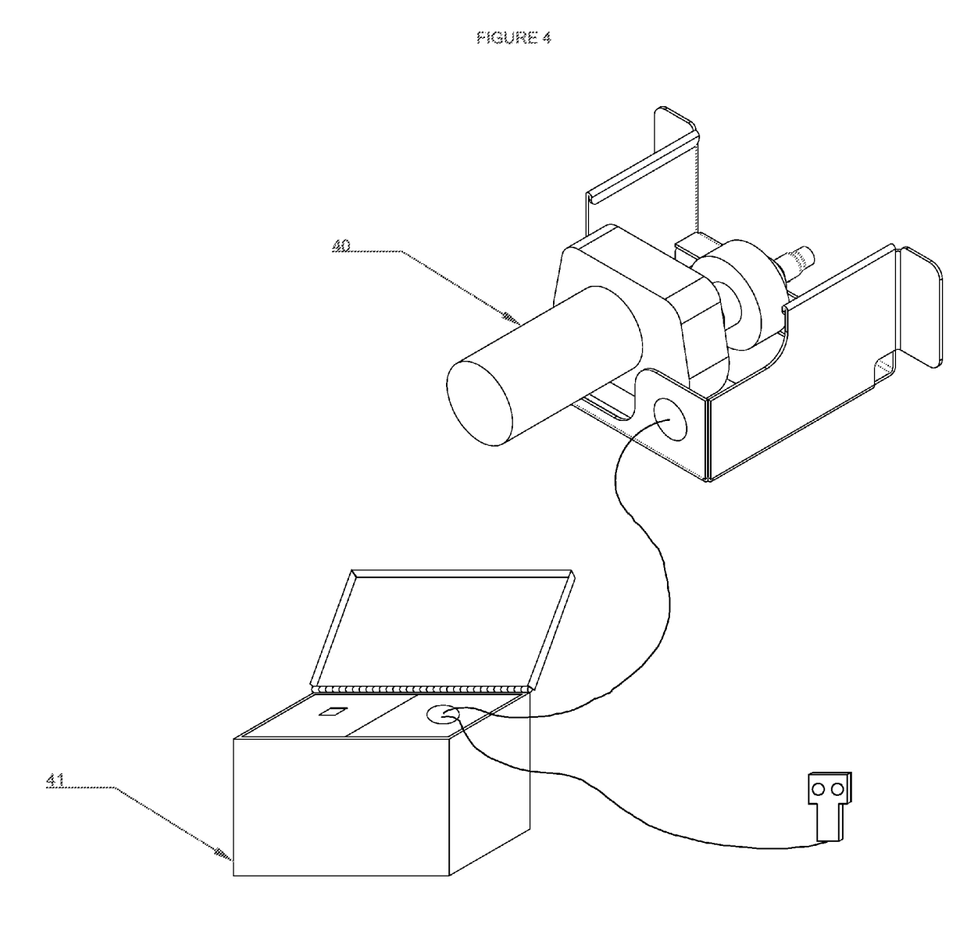
FIG. 4 is a perspective view of an exemplary motor and remote control instrument of the removable contactor drawer.
Figure 5:
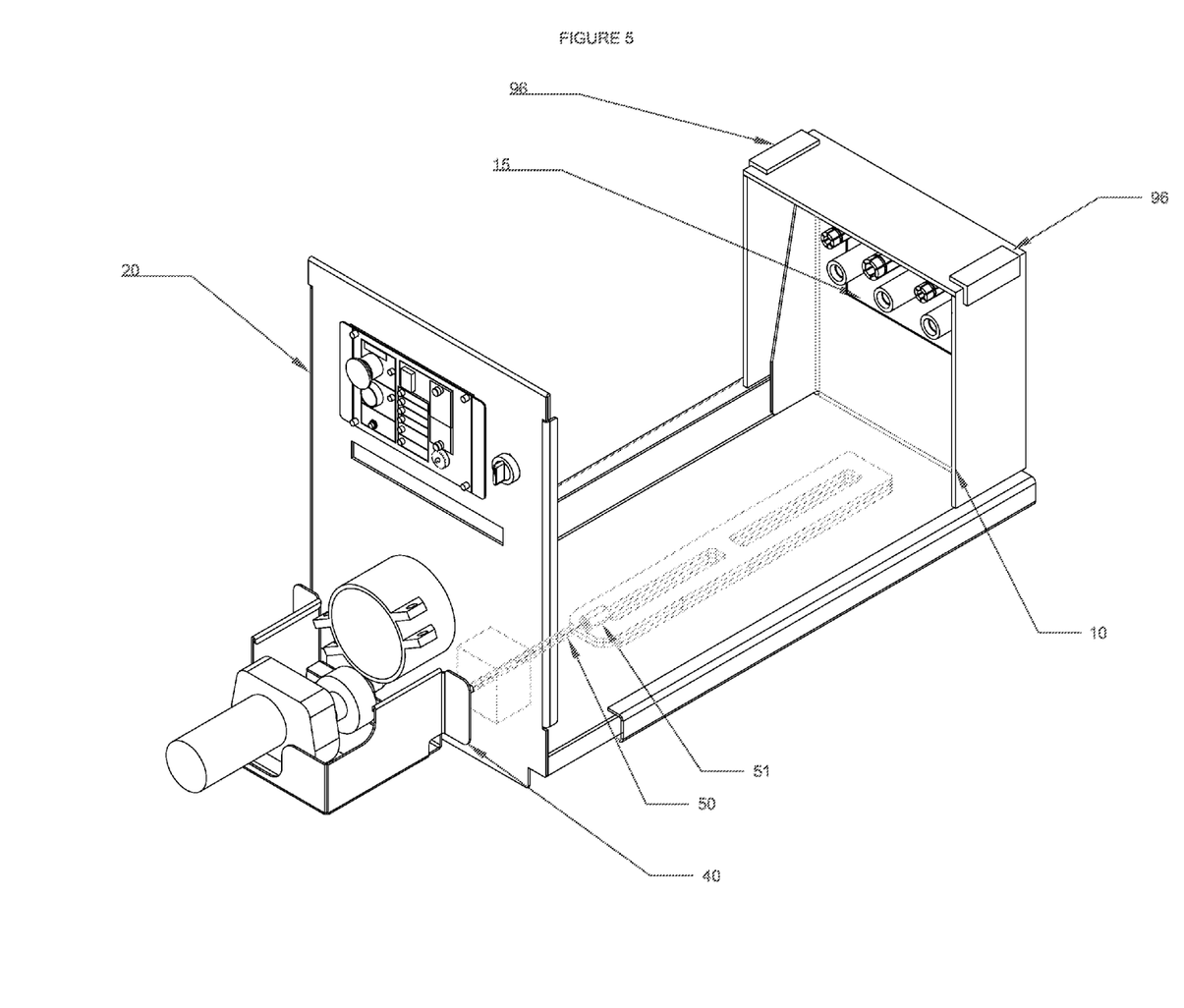
FIG. 5 is a perspective view of an exemplary worm actuator, and actuator catch for use in a transitional chamber of the removable contactor drawer.

To further protect against injury to an operator resulting from arc flash, insertion or removal of the transitional chamber 20 from the fixed casing 10 may be performed remotely. FIG. 4 shows a motor 40 and remote control box 41 in an exemplary embodiment of a remote operating instrument. The motor 40 and remote control box 41 allow for remote insertion or removal of the transitional chamber 20 from the fixed casing 10 to be accomplished while mine power is energized, thus keeping the operator or service technician away from the area of arc flash danger. Although an exemplary motor 40 and remote control box 41 are depicted in FIG. 4, the subject matter of the present application is not limited to the exemplary embodiment. Other systems and methods of remotely operating the drawer are contemplated herein without departing from the scope of the present application. FIG. 5 shows an exemplary embodiment of operational structure that may be used in the remote insertion and withdrawal of the transitional chamber 20 from the fixed casing 10. As shown in FIG. 5, engagement and disengagement of the transitional chamber 20 from the fixed casing 10 may be accomplished using a worm actuator 50 driven by the motor 40 and configured to engage the actuator catch 51 (FIG. 2). The motor 40, and therefore movement of the transitional chamber 20 of the drawer relative to the fixed casing 10, is activated using the remote control box 41.

Alternatively, the worm gear 50 may be driven manually using a wrench (not shown) fitted to drive the worm gear 50. Although a drive system including a worm gear 50 and actuator catch 51 is depicted in FIG. 5, the subject matter of the present application is not limited to the exemplary embodiment. Other systems and methods of operating the drawer are contemplated herein without departing from the scope of the present application.

In an example embodiment, the motor 40 is prevented from being used while the plug 27 and trailing cable 28 are in place due to spacing limitations. This spacing feature provides an additional measure of safety because no current can be flowing through the power outlet 26 at the time when the motor 40 is attached or removed.

In an example embodiment, to further protect against the danger of arc flash, one or more vented slots or louvered openings 95 may be included in the rear panel 11 of the fixed casing 10 to allow arc flash to be routed away from the vicinity of operators and other personnel to the inside of the power center 94.

Arc flash danger may also be reduced through the use of one or more angle supports 96 to prevent or mitigate damage to the top rear of the fixed casing 10 during an arc flash by reinforcement of the structural integrity of the arc flash shield 14.

Figure 6:
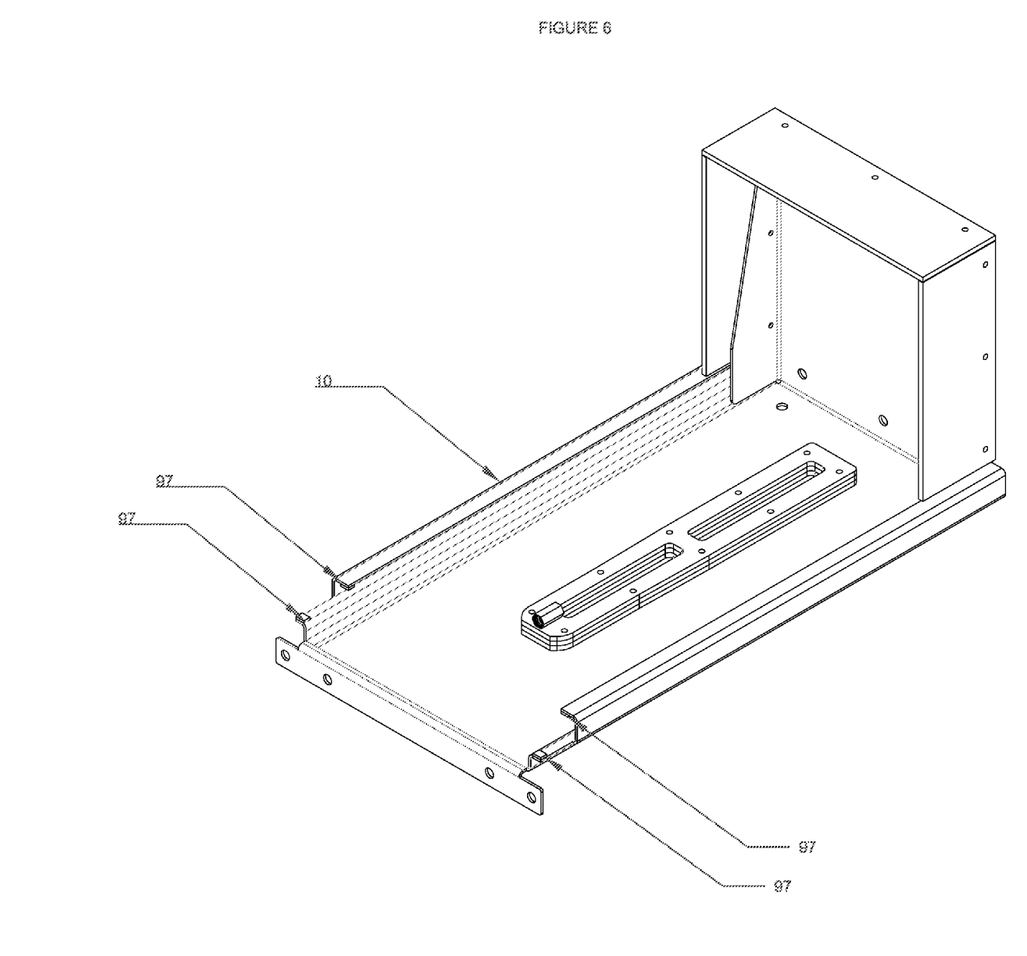
FIG. 6 is a perspective view of a preliminary stop device.

In an example embodiment, a preliminary stop device 97 may be used to keep the transitional chamber from being unintentionally dropped from the fixed casing. The preliminary stop device 97 is depicted in FIG. 6. This feature protects workers and other personnel from harm during in-place repairs of the transitional chamber and/or associated equipment. The preliminary stop device 97 consists of one or more small plates welded or otherwise secured to the support members of the fixed casing 10. When the transitional chamber 20 is being removed from the fixed casing 10, the rollers 33 come into contact with the preliminary stop device 97 and prevent removal unless extra lifting force is applied.

In an example embodiment, the drive unit for the transitional chamber cannot be attached with the trailing cable engaged, thereby assuring that power downstream from the transitional chamber is shut off during such maintenance work.

The general concept stated herein may be changed and/or modified without departing from the model defined in this document. Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

I claim:

1. A removable contactor drawer configured to be utilized in an electrical distribution system, the contactor drawer comprising:
   a fixed casing including at least one main bus input connector configured to receive input electrical power from a source;
   a transitional chamber including at least one switch and an electrical interface configured to operatively engage with the at least one main bus input connector of the fixed casing, said transitional chamber being movable relative to the fixed casing;
   an arc flash suppression device in at least one of the fixed casing or the transitional chamber configured to suppress arc flash during engagement or disengagement of the transitional chamber and the fixed casing while the contactor drawer is electrically charged;
   a power outlet receptacle on a front of the transitional chamber, the power outlet configured to couple to a trailing cable, the trailing cable configured to couple to driven operating equipment; and
   a drive unit configured to couple to the front of the transitional chamber, the drive unit being unattachable to the front of the transitional chamber while the trailing cable is coupled to the power outlet receptacle.

2. The removable contactor drawer as recited in claim 1, further comprising:
   the drive unit attached to the contactor drawer to insert or remove the transitional chamber from the fixed casing; and
   a remote motor drive operating unit configured to allow an operator to be remotely located from the removable contactor drawer during insertion or removal of the transitional chamber from the fixed casing.

3. The removable contactor drawer as recited in claim 2, wherein the remote motor drive operating unit includes a worm gear connected to the drive unit to actuate movement of the transitional chamber relative to the fixed casing.

4. The removable contactor drawer as recited in claim 1, further comprising rollers fixed to at least one of the transitional chamber or the fixed casing, wherein the rollers enhance the engagement of the transitional chamber and the fixed casing.

5. The removable contactor drawer as recited in claim 1, wherein the transitional chamber further includes a tray, a front panel at a first end of the tray and a connector bracket at a second end of the tray, and wherein the at least one switch is mounted to the tray and is in contact with the electrical interface, the electrical interface being mounted to the connector bracket.

6. The removable contactor drawer as recited in claim 5, wherein the front panel includes at least one of an observation window or a control panel.

7. The removable contactor drawer as recited in claim 1, wherein the at least one main bus input connector and the electrical interface are each mounted on a respective non-conductive board.

8. The removable contactor drawer as recited in claim 1, wherein the arc flash suppression device includes at least one vented slot or at least one louvered opening to allow the arc flash to be kept out of an area in which personnel would be found and routed out of a back of the contactor drawer.

9. The removable contactor drawer as recited in claim 1, wherein the arc flash suppression device includes a reinforcement member that strengthens a top of the fixed casing to prevent deformation and rupture of the top of the contactor drawer during the arc flash.

10. The removable contactor drawer as recited in claim 1, further comprising:
    a protective preliminary stop device which prevents the transitional chamber from being totally removed from the fixed casing unless total removal is intended, thus protecting personnel from harm during in-place repair of the transitional chamber or any associated equipment, wherein the protective preliminary stop device includes one or more metal plates welded or otherwise secured to support members of the fixed casing.

* * * * *